Oct. 4, 1960
A. O. JOHNSON
2,954,967
FUEL ECONOMIZER FOR INTERNAL COMBUSTION ENGINES
Filed Sept. 24, 1958
2 Sheets-Sheet 1
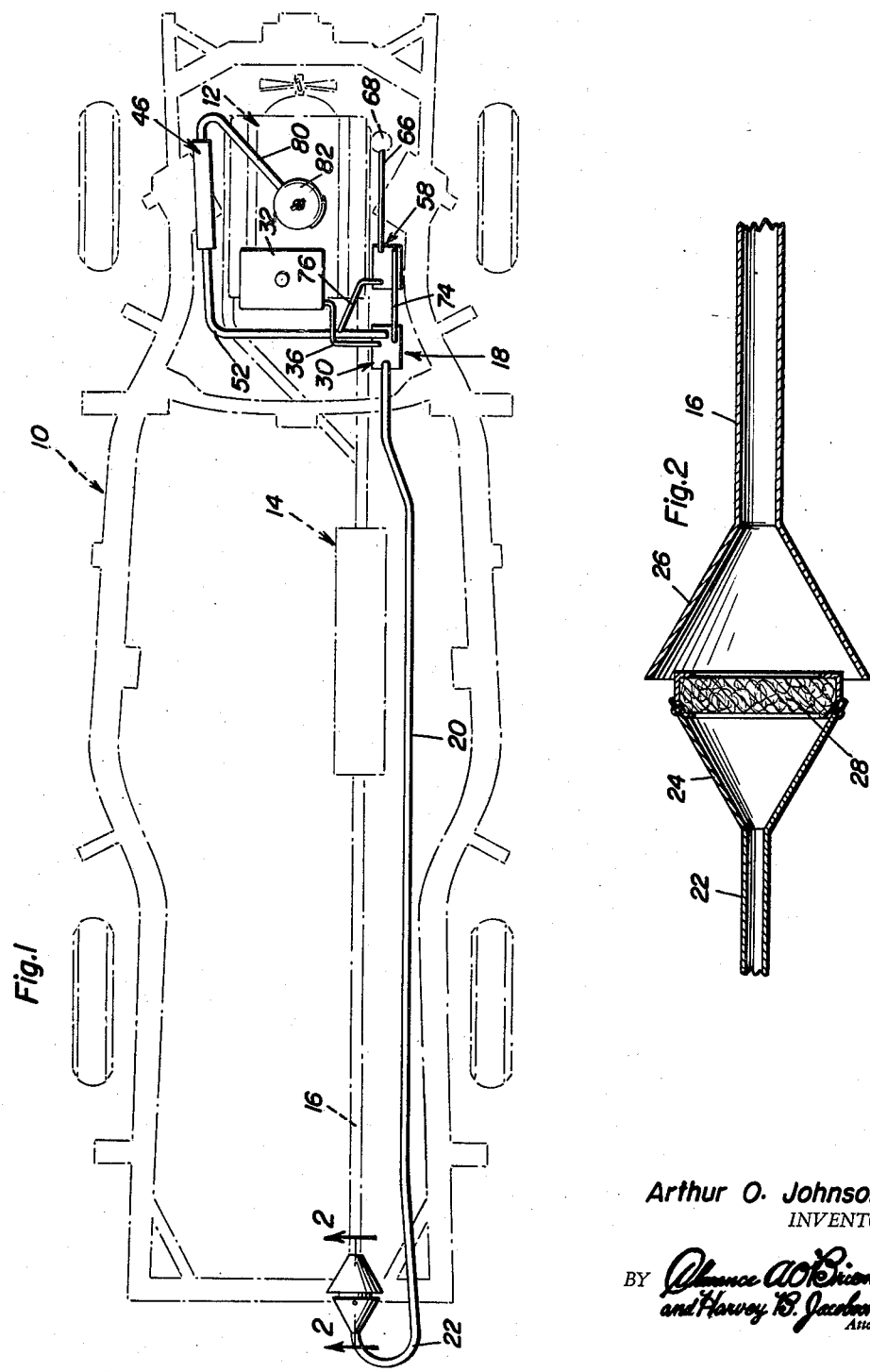
Arthur O. Johnson
INVENTOR.

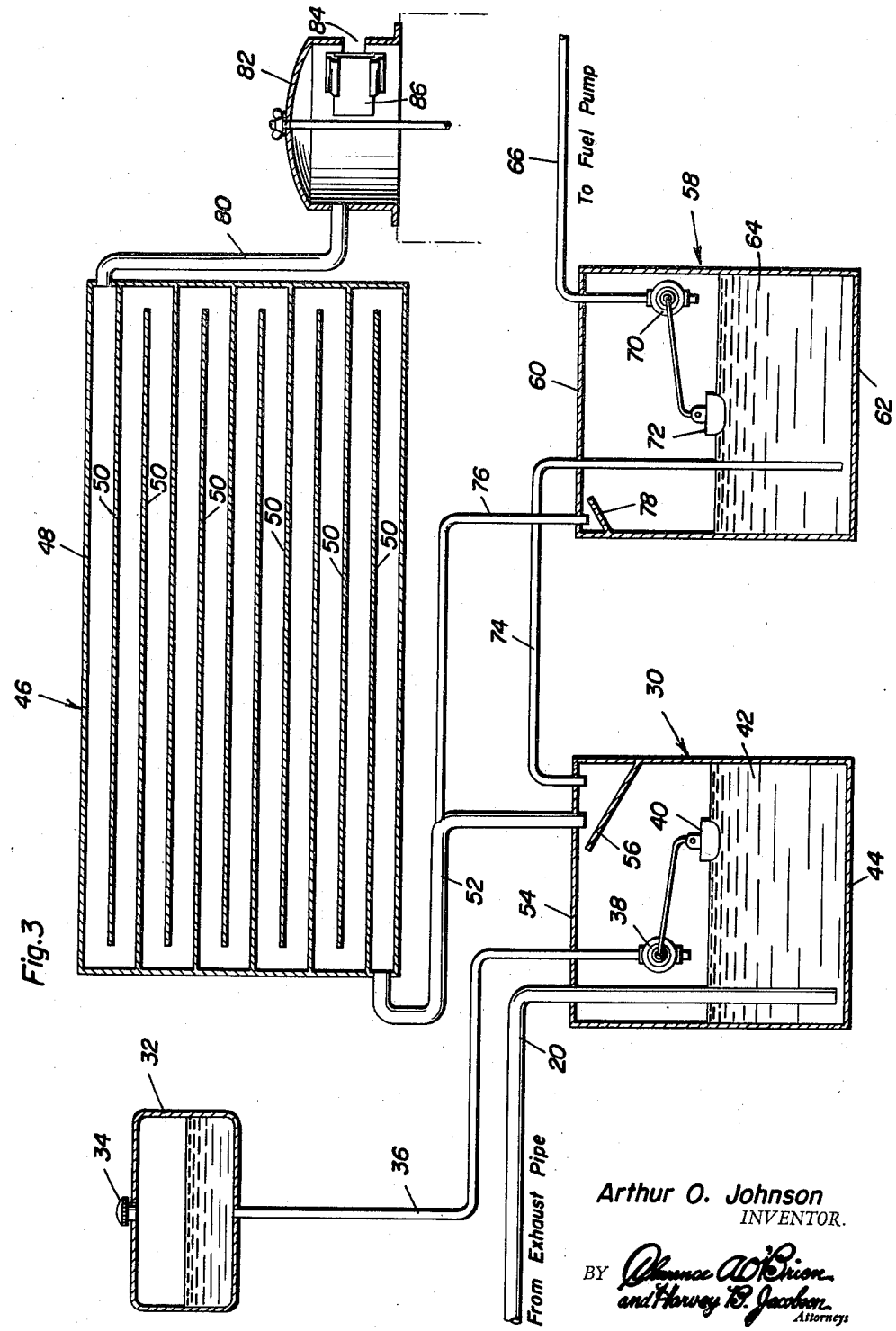

United States Patent Office 2,954,967
Patented Oct. 4, 1960

2,954,967

FUEL ECONOMIZER FOR INTERNAL COMBUSTION ENGINES

Arthur O. Johnson, 212 NE. 26th St., Miami 37, Fla.

Filed Sept. 24, 1958, Ser. No. 763,130

8 Claims. (Cl. 261—144)

This invention relates in general to new and useful improvements in fuel systems for internal combustion engines, and more particularly to an improved fuel economizer attachment for internal combustion engines.

It is a well known fact that internal combustion engines do not operate at 100% efficiency. As a matter of fact, the maximum efficiency of internal combustion engines is in the vicinity of 30%. The losses may be primarily divided into two groups. The first group is composed of the heat losses. The second group is due to the incomplete burning of the fuel within the cylinders. This latter waste is constantly being pumped out into the streets of our cities and along our highways and the majority thereof could be salvaged.

It is therefore the primary object of this invention to provide a fuel economizer attachment for internal combustion engines, the attachment being of such a nature whereby a more complete combustion of the fuel in the cylinders is obtained thereby increasing the efficiency of the internal combustion engines and thus minimize pollution of the atmosphere by the combustion products of the internal combustion engine.

Another object of this invention is to provide a fuel economizer attachment for internal combustion engines which is of such a nature whereby a large percentage of the exhaust gases from the internal combustion engine is returned to the internal combustion engine so that both the heat carried thereby and the unused fuel particles may be utilized in the obtaining of maximum efficiency with the internal combustion engine.

It has been found in the past that by injecting fuel into the internal combustion engine at the proper stage, the efficiency of the internal combustion engine can be increased. It is another object of this invention to provide moisture to the incoming gases of an internal combustion engine whereby the humidity of the gases may be increased to the point whereby a more complete atomization of the gasoline is obtained and a more efficient burning of the gasoline results.

Still another object of this invention is to provide a fuel economizer for internal combustion engines, the fuel economizer being of such a nature whereby incoming gases into the internal combustion engine are of the proper humidity for maximum efficiency and contain a small percentage of fuel which is properly vaporized whereby the incoming gases, when mixed with the fuel supply from the carburetor, will provide a more perfect combustible fuel mixture so as to obtain a more efficient operation of the internal combustion engine.

A further object of this invention is to provide a fuel economizer attachment for internal combustion engines, which attachment is so constructed whereby a large percentage of the exhaust gases from the internal combustion engine is returned to the intake thereof, the exhaust gases being passed through a water bath whereby the humidity of the exhaust gases becomes that desired for the maximum efficiency of the internal combustion engine, the increase in humidity of the exhaust gases also properly conditioning the exhaust gases whereby the unused fuel content thereof is readily vaporized for a complete burning within the internal combustion engine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view of the conventional type of internal combustion engine and its associated vehicle and shows mounted thereon the fuel economizer attachment which is the subject of this invention;

Figure 2 is an enlarged fragmentary sectional view taken substantially upon the plane indicated by the section line 2—2 of Figure 1 and shows the manner in which a large portion of the exhaust gases from the exhaust pipe of the vehicle are salvaged and returned to the internal combustion engine thereof; and Figure 3 is an enlarged schematic view of the remainder of the fuel economizer attachment and shows the specific details of all components thereof.

Referring now to the drawings in detail, it will be seen that there is illustrated in Figure 1 a portion of a conventional type of motor vehicle which is referred to in general by the reference numeral 10. The motor vehicle 10 includes an internal combustion engine which is referred to in general by the reference numeral 12. The internal combustion engine 12 has connected thereto an exhaust system which is referred to in general by the reference numeral 14, the exhaust system including a tail pipe 16. At this time it is pointed out that the vehicle 10 is of the single exhaust type. However, for the purposes of this invention, the vehicle may have dual exhausts, in which event, it would be necessary to provide additional piping so that a portion of the exhaust gases from each of the exhausts may be returned to the fuel economizer attachment.

Mounted on the vehicle 10 is the fuel economizer attachment which is the subject of this invention, the fuel economizer attachment being referred to in general by the reference numeral 18. The fuel economizer attachment 18 includes an intake line 20 which extends substantially the full length of the vehicle 10, and which terminates at its rear end in a reversely bent portion 22 which in turn terminates in a funnel shaped pick-up 24. The funnel shaped pick-up 24 is aligned with a funnel shaped end 26 of the tail pipe 16, the diameter of the funnel shaped end 26 being greater than the diameter of the funnel shaped portion 24.

It is only desired that a portion of the exhaust gases passing through the tail pipe 16 be collected. For that reason, the funnel shaped portion 24 is of a lesser diameter than the funnel shaped end 26 and is spaced therefrom to permit the escape of excess exhaust gases. In order to prevent the entry of foreign matter, such as loose carbon and the like, into the funnel shaped portion 24, there is provided a filter 28. The filter 28 may be of any construction. However, it is desirable that the filter 28 be removable for purposes of cleaning.

Mounted adjacent the internal combustion engine 12 is a water supply tank which is referred to in general by the reference numeral 30. Suitably mounted adjacent the water supply tank 30 is a water reservoir 32. The water reservoir 32 is filled by means of a filler cap 34 and water is supplied to the water supply tank 30 by means of a water supply line 36 which extends from the bottom of the water reservoir 32 into the interior of the water supply tank 30. A valve 38 controls the flow of water into the water supply tank 30. The valve 38 is controlled by means of a float 40 so that water 42 disposed within the water supply tank 30 is retained generally at a constant level.

As is best shown in Figure 3, the forward end of the intake line 20 extends down into the water supply tank 30 and terminates adjacent the bottom wall 44 thereof. Gases entering into the water supply tank 30 through the intake line 20 must bubble upwardly through the water 42.

The fuel economizer attachment 18 also includes a combined expansion and mixing chamber which is referred to in general by the reference numeral 46. The combined expansion and mixing chamber 46 includes a housing 48 in which are positioned a plurality of horizontally disposed baffles 50 which alternatingly terminate adjacent to the ends of the housing 48 so as to form a tortuous passage through the housing 48.

Extending from one end of the combined expansion and mixing chamber 46 to the water supply tank 30 is a delivery line 52. The delivery line 52 terminates within the water supply tank 30 adjacent the top wall 54 thereof. The delivery line 52 is separated from the remainder of the water supply tank 30 by means of a baffle 56 to prevent the direct splashing of water into the delivery tube 52.

The fuel economizer attachment 18 also includes a fuel supply tank which is referred to in general by the reference numeral 58 and which includes a top wall 60 and a bottom wall 62. Fuel, such as gasoline, is retained within the fuel supply tank 58 at a constant level, the fuel being referred to by reference numeral 64. The fuel 64 is supplied to the fuel supply tank 58 by means of a fuel line 66 which is connected to the fuel pump 68 of the internal combustion engine 12. The level of the fuel 64 is retained generally constant by means of a valve 70 which is controlled by means of a float 72.

Extending from the water supply tank 30, above the baffle 56 is an inlet line 74. The inlet line 74 extends down into the fuel supply tank 58 through the fuel 64 and terminates adjacent the bottom wall 62. Thus gases entering into the fuel supply tank 58 from the water supply tank 30 must bubble upwardly through the fuel 64.

Connected to the fuel supply tank 58 and terminating therewithin adjacent the top wall 60 thereof is a gaseous fuel supply line 76. The gaseous fuel supply line 76 has disposed therebelow a baffle 78 to prevent the entrance of raw fuel 64 thereinto. The opposite end of the gaseous fuel supply line 76 opens into the delivery line 52. If desired, the gaseous fuel supply line 76 may open directly into the combined expansion and mixing chamber 46 adjacent the delivery line 52.

Extending from the combined expansion and mixing chamber 46 remote from the connection of the delivery line 52 therewith is a supplemental supply pipe 80. The supplemental supply pipe 80 opens into an intake adapter 82 for the carburetor of the internal combustion engine 12. The intake adapter 82 is also provided with an air inlet opening 84 which is controlled by means of a valve 86 to obtain the proper relation of incoming air to gases being delivered to the intake adapter from the supplemental supply pipe 80.

In the operation of the internal combustion engine 12 with the fuel economizer attachment 18, a desired percentage of the exhaust gases are salvaged from the tail pipe 16 and passed through the intake line 20. These exhaust gases will, of course, contain both combustible gases, such as carbon monoxide, hydrogen and the like as well as unburnt fuel vapor, such as methane. As the gases bubble through the water 42, a desired amount of water is picked up and absorbed by the exhaust gases. This increases the humidity of the exhaust gases. Furthermore, because of the fact that the exhaust gases are cooled as they pass up through the water supply tank 30, the exhaust gases become more condensed as they pass through the delivery line 52.

These humid exhaust gases, when they enter the combined expansion and mixing chamber 46, again expand because of both the construction of the combined expansion and mixing chamber 46 and the proximity thereof to the heat of the internal combustion engine 12.

A small portion of the humid exhaust gases pass through the inlet line 74 into the fuel supply tank 58 and back thereoutof through the gaseous fuel supply line 76 and are delivered either directly into the combined expansion and mixing chamber 46 or thereinto through the delivery line 52. These latter exhaust gases carry vaporized fuel and mix with the humid exhaust gases so as to provide a fuel enriched gas supply. This fuel enriched gas supply passes out through the supplemental supply pipe 80 into the intake adapter 82 where it mixes with the required supply of incoming air through the air intake opening 84. The over-all result of this fuel enrich gaseous supply permits a leaner mixture to be drawn from the carburetor of the internal combustion engine 12 and at the same time to produce more efficient results therewith. This, of course, results in a great economy in the operation of the internal combustion engine 12 with the internal combustion engine 12 operating at near its maximum efficiency.

Although it has been specifically illustrated and described that the exhaust gases are received from the tail pipe of the exhaust system of the vehicle at the rear end thereof, it is to be understood that the present invention may be connected to the exhaust system at any point along its length. In fact, it may be desirable to connect to the exhaust system adjacent the exhaust manifold in order that the amount of piping may be greatly reduced.

There has been illustrated and described but a single water supply tank 30 and a single fuel supply tank 38. However, the number of these individual supply tanks may be varied as is desired. In addition to this, there may be provided an additional expansion and mixing chamber, such as the expansion and mixing chamber 46.

In the preferred form of the invention the treated gases are directed into the carburetor. However, many late model vehicles are provided with very large air cleaners having an opening for receiving air at some point around the circumference thereof. If desired, the treated gases may be directed into this opening in lieu of the connection illustrated.

It is to be noted that a major portion of the present invention is mounted within the engine compartment of the vehicle. Thus it receives heat from the engine. Additional heat, if desired necessary, may be obtained from the exhaust manifold which may be used for heating such gases as is desired.

It is to be appreciated that the gasoline mileage obtainable with the fuel economizer adapter 18 will vary depending upon the particular internal combustion engine and the vehicle in which it is placed. However, through tests it has been found that the gasoline mileage of a vehicle equipped with the fuel economizer attachment 18 is greatly increased over that when operating under optimum circumstances with its original design. It is also to be understood that the fuel economizer attachment 18 is of such a nature whereby it is readily adaptable to both present car structure, and new cars and due to the relative simplicity thereof, the beneficial savings resulting therefrom will greatly offset the initial cost thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fuel economizer for internal combustion engines comprising a water supply tank, means for maintaining a general constant level of water within said water supply tank, an intake line extending into said water supply tank and terminating below the water level, a combined mixing and expansion chamber, a delivery line having one end terminating above the liquid level in said water supply tank with the other end communicating with said mixing and expansion chamber, an auxiliary fuel supply tank, means for maintaining a constant fuel level within said fuel supply tank, an inlet line extending into said fuel tank and terminating below the fuel level therein, said inlet extending from the water supply tank above the water level therein, a gaseous supply line extending from said fuel supply tank above said fuel level and communicating with said mixing and expansion chamber, and a supplemental supply line extending from said expansion and mixing chamber for attachment to an internal combustion engine air intake.

2. The combination of claim 1 including an intake adapter for a carburetor, an air inlet opening in said intake adapter, said supplemental supply pipe opening into said air intake adapter, means for controlling the flow of air through said air inlet opening.

3. The combination of claim 1 wherein said combined expansion and mixing chamber includes a tortuous passage.

4. The combination of claim 1 wherein said mixing and expansion chamber is adapted to be mounted adjacent and in good heat exchange relation with the exhaust manifold of the internal combustion engine.

5. The combination of claim 1 including means on said intake line for receiving exhaust gases from an associated internal combustion engine.

6. The combination of claim 1 including means on said intake line for receiving exhaust gases from an associated internal combustion engine, said mixing and expansion chamber being adapted to be mounted adjacent and in good heat exchange relation with the exhaust manifold of the internal combustion engine.

7. The combination of claim 1 including means on said intake line for receiving exhaust gases from an associated internal combustion engine, said mixing and expansion chamber being adapted to be mounted adjacent and in good heat exchange relation with the exhaust manifold of the internal combustion engine, said combined expansion and mixing chamber including a tortuous passage.

8. The combination of claim 1 including means on said intake line for receiving exhaust gases from an associated internal combustion engine, said last mentioned means including a filter for restricting the entrance of foreign matter into the water supply tank.

References Cited in the file of this patent

UNITED STATES PATENTS

| | | |
|---|---|---|
| 1,790,991 | Marguette | Feb. 3, 1931 |
| 2,053,200 | Miller et al. | Sept. 1, 1936 |
| 2,349,676 | Pratt | May 23, 1954 |